US012675171B2

(12) United States Patent
Silverstein et al.

(10) Patent No.: US 12,675,171 B2
(45) Date of Patent: Jul. 7, 2026

(54) ERGONOMIC KEYBINDING ADJUSTMENTS FROM USER BEHAVIORAL INPUT

(71) Applicant: INTERNATIONAL BUSINESS MACHINES CORPORATION, Armonk, NY (US)

(72) Inventors: Zachary A. Silverstein, Georgetown, TX (US); Tyler Hansen, Tucson, AZ (US); Logan Bailey, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 18/455,145

(22) Filed: Aug. 24, 2023

(65) Prior Publication Data

US 2025/0068259 A1     Feb. 27, 2025

(51) Int. Cl.
G06F 3/023          (2006.01)
G06F 11/34          (2006.01)

(52) U.S. Cl.
CPC ........ G06F 3/0238 (2013.01); G06F 11/3438 (2013.01)

(58) Field of Classification Search
CPC .......................... G06F 11/3438; G06F 3/0238
See application file for complete search history.

(56) References Cited

U.S. PATENT DOCUMENTS 9,342,160 B2    5/2016  Bailey et al.
10,649,642 B2   5/2020  Cen et al.

10,996,850 B2 *  5/2021  Kim ........................ G06N 20/20
11,419,524 B2    8/2022  Santello
2012/0081239 A1 *  4/2012  Robinson .............. G06F 3/0238
                                                    341/22
2016/0100465 A1 *  4/2016  Prescott ................ G06F 3/0219
                                                    345/170
2022/0329898 A1 *  10/2022  Emmanuel ......... H04N 21/4667

FOREIGN PATENT DOCUMENTS

CN      109582156 A      4/2019
CN      114945417 A      8/2022
DE      10332575 A1 *    2/2004    .......... G06F 3/0238
EP      1674975 B1       7/2015

(Continued)

OTHER PUBLICATIONS

"Repetitive strain injury amongst IT workers and computer users", London Pain Clinic, https://www.londonpainclinic.com/computers-and-pain/repetitive-strain-injury-amongst-it-workers-and-computer-users, Referenced Aug. 24, 2023, (6 pages).

(Continued)

*Primary Examiner* — Stacy Khoo
(74) *Attorney, Agent, or Firm* — Michael A. Petrocelli

(57)          ABSTRACT

Various embodiments are provided herein for making ergonomic keybinding adjustments based on user behavioral inputs in a computing environment having one or more processor devices. One or more metrics of a user input are measured. If the one or more metrics are determined to exceed a predetermined threshold, one or more of the user behavioral inputs associated with the one or more metrics are identified to be provided to a keybinding adjustment o the one or more behavioral inputs.

14 Claims, 3 Drawing Sheets

(56)　　　　　　References Cited

FOREIGN PATENT DOCUMENTS

KR　　20150022599 A　*　3/2015
WO　　　2005091103 A1　　9/2005

OTHER PUBLICATIONS

IBM Accessibility, "Equal Access Toolkit—Design", Jun. 13, 2025, 02 pages, https://www.ibm.com/able/toolkit/design/ux/overview/.
IBM Design language, "2x Grid", Jun. 13, 2025, 19 pages, https://www.ibm.com/design/language/2x-grid/.
IBM Workplace Design, Design characteristics, Jun. 13, 2025, 17 pages, https://www.ibm.com/design/workplace/design-characteristics/.
IBM Workplace Design, Individual, Jun. 13, 2025, 10 pages, https://www.ibm.com/design/workplace/space-types/individual/enclosed-spaces/.
Kienzler Romeo, "Digital twins and the Internet of Things", How to throw AI models at vast amounts of historic and real-time IoT data, IBM, May 14, 2024, 10 pages, https://developer.ibm.com/articles/digital-twins-and-the-internet-of-things/.

* cited by examiner

100

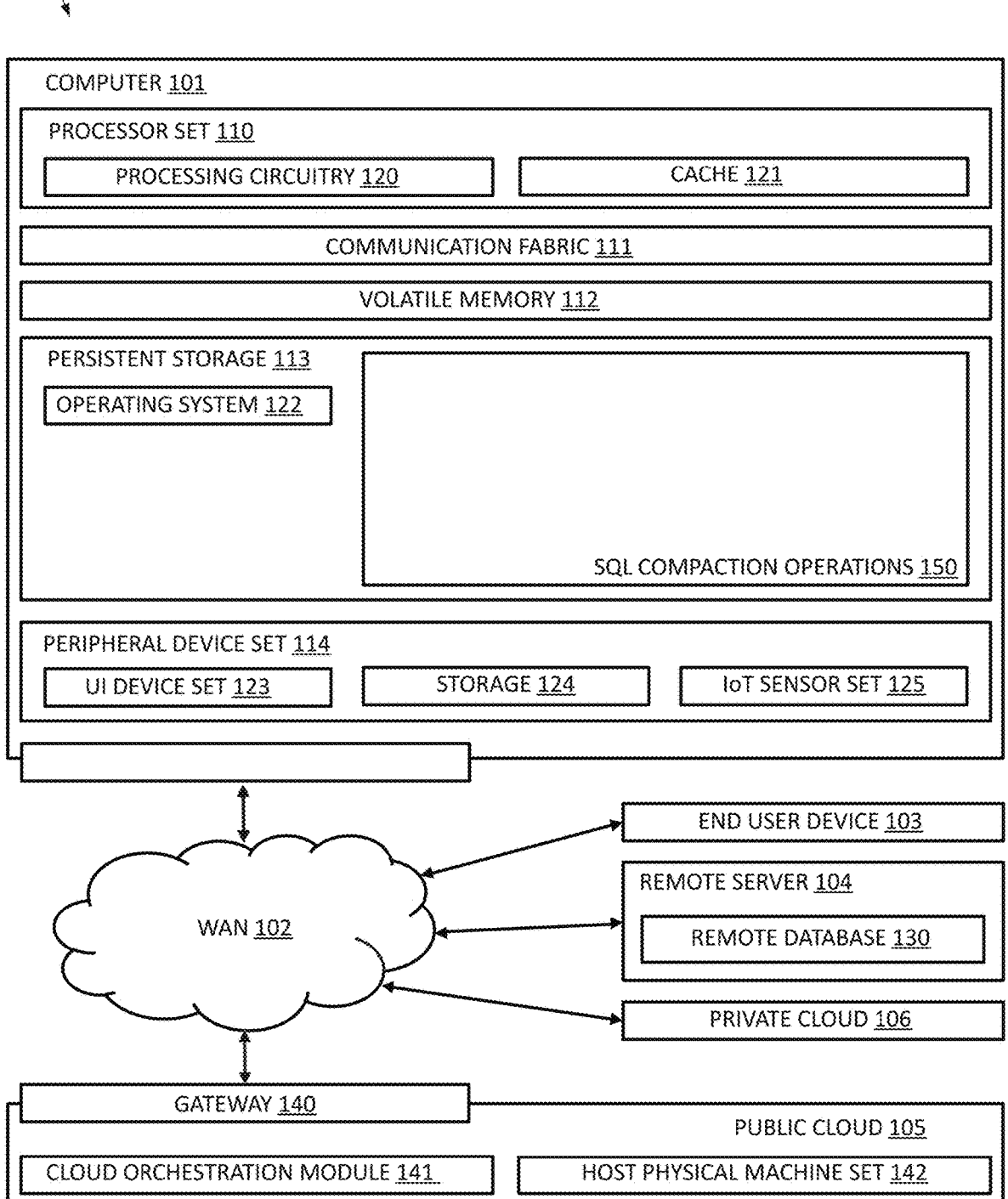

COMPUTER 101

PROCESSOR SET 110

PROCESSING CIRCUITRY 120    CACHE 121

COMMUNICATION FABRIC 111

VOLATILE MEMORY 112

PERSISTENT STORAGE 113

OPERATING SYSTEM 122

SQL COMPACTION OPERATIONS 150

PERIPHERAL DEVICE SET 114

UI DEVICE SET 123    STORAGE 124    IoT SENSOR SET 125

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141    HOST PHYSICAL MACHINE SET 142

VIRTUAL MACHINE SET 143    CONTAINER SET 144

FIG. 1

ERGONOMIC KEYBINDING ADJUSTMENTS FROM USER BEHAVIORAL INPUT

BACKGROUND

The present invention relates in general to computing systems, and more particularly, to various embodiments for effecting intelligent, ergonomic keybinding adjustments based on user behavior inputs in a computing environment.

SUMMARY

According to an embodiment of the present invention, a method for intelligent, ergonomic keybinding adjustments based on user behavioral inputs in a computing environment, is provided. One or more metrics of user behavioral input(s), is measured. If the metric(s) are determined to exceed a predetermined threshold, which of the user behavioral input(s) associated with the metric(s) is provided to a keybinding adjustment reproducing the user behavioral input(s).

An embodiment includes a computer usable program product. The computer usable program product includes a computer-readable storage device, and program instructions stored on the storage device. The computer usable program product includes program instructions for implementing the aforementioned keybinding adjustments in the computing environment.

An embodiment includes a computer system. The computer system includes a processor, a computer-readable memory, and a computer-readable storage device, and program instructions stored on the storage device for execution by the processor via the memory. In one embodiment, a portion of the computer system is adapted for implementing the aforementioned keybinding adjustments, such as a programmed hardware device.

Thus, in addition to the foregoing exemplary method embodiments, other exemplary system and computer product embodiments are provided.

BRIEF DESCRIPTION OF THE DRAWINGS

FIG. 1 is a block diagram depicting an exemplary cloud computing node according to an embodiment of the present invention.

DETAILED DESCRIPTION OF THE DRAWINGS

Figure 2:
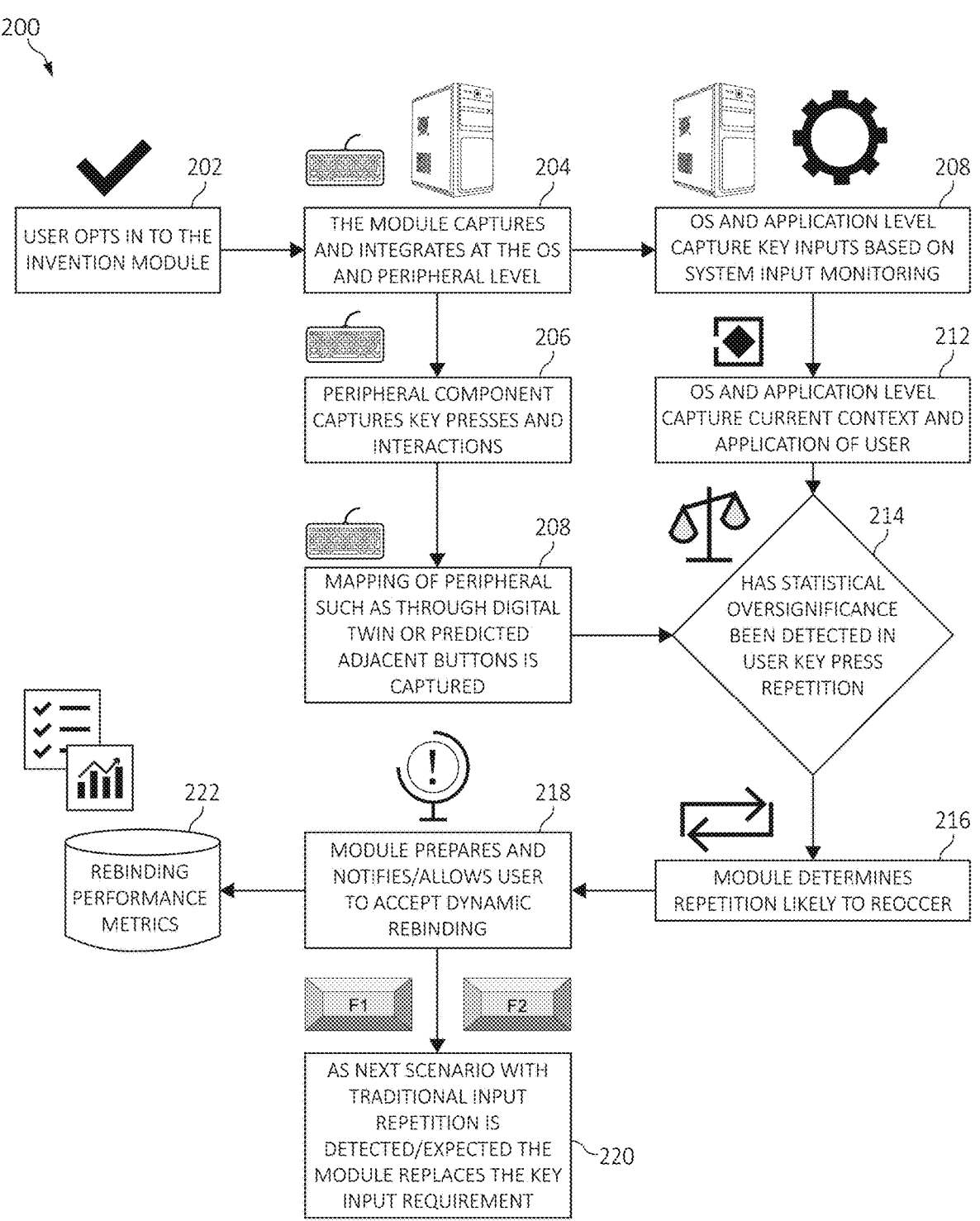
FIG. 2 is a flow chart diagram depicting an exemplary method for effecting intelligent, ergonomic keybinding adjustments in a computing environment, in which at least some of the mechanisms of the present invention are implemented

As global utilization of computers and attendant computer peripheral equipment requiring user input, such as keyboards, mice, trackpads and other devices continues to increase, both in the actual numbers of users as well as a percentage of global population, proper ergonomic support is becoming increasingly necessary to ensure optimal physical health.

Research shows that as many as sixty percent (60%) of persons who use a computer for eight or more hours a day are likely to suffer from varying symptoms of Repetitive Strain Injury (RSI). The effects of RSI are extremely difficult to remedy or cure, and as such, preventative measures are more beneficial for implementation as a preliminary matter, rather than an attempt to alleviate symptoms down the road.

Due to the repetitive nature of many computer and computer peripheral device-related tasks, users often find themselves performing the exact same physical movements throughout the day. Tasks such as the use of specific keyboard keys, and key-combinations inherently involve repetition of the same muscle groups, and potential long-term damage. As such, a need exists for mechanisms to proactively address repetitive tasks performed by a user to reduce or eliminate the RSI damage that might occur over a prolonged time without such mechanisms.

To address this aforementioned need, the mechanisms of the illustrated embodiments provide solutions for effecting intelligent, ergonomic keybinding adjustments, based on the user's behavioral input(s) as will be further described, following. These mechanisms utilize, in one exemplary embodiment, functionality such as integrated artificial intelligence (AI) deep learning operations, propose, and implement, if the user so chooses, various key reassignments, and other operations, and feature various functionality for improving the overall ergonomic condition of a specific user, as will be described.

For example, in one exemplary embodiment, a method is disclosed for detecting, recording, and monitoring user input behaviors. As a result of this monitoring activity, a dynamic remapping of user action inputs negatively affecting the user's ergonomic condition is undertaken, such as various keybinding adjustments as will be further described, so as to optimize the applicable human-centric ergonomic conditions the user may experience.

As such, in one embodiment, the mechanisms of the illustrated embodiments may incorporate methodologies in which the frequency of user behavioral inputs is measured, and those which surpass a certain level of repetitiveness are identified and incorporated into a keybinding adjustment module. The module may take the form of hardware, software, firmware, or a combination thereof as one of ordinary skill in the art will appreciate.

In view of the foregoing, consider the following example. An employee working in data entry may commonly use the keys F1 through F4 to navigate their company software, so each of those keys may be pressed hundreds of times per day, every day. A system incorporating the mechanisms of the present invention may then monitor the keystrokes of the user over a period of time, and thereby identify a high level of repetition. Based on the identified ergonomic health hazard, the system may determine an alternative, less ergonomically hazardous key mapping configuration. The system may notify the user, recommend the alternative key-mapping configuration, while maintaining context within adjacent keys, which will also be remapped. For example, as F1-F4 are contiguous on the keyboard, the system will attempt to maintain contiguousness when choosing alternative key mapping configurations.

In addition to the foregoing, the system, when notifying the user, may also provide the user with the option to accept, and adopt the remapped key configuration, provide the user with an option to disable all recommendations for a period of time, or provide the user with an option to disable recommendations of this specific remapping, portions of all recommendations, or disable the recommendations altogether.

Continuing the foregoing example, the system may advise the user that they have reached a possibly harmful level of repetition, and prompt the user to change the F1 through F4 key bindings to F9 through F12, allowing the user to switch hands to reduce repetitive strain. As will be further described, the system, in one embodiment, may incorporate Artificial Intelligence (AI) deep learning functionality, so that the system, based on an intelligent examination of the history of the user's behavioral motion, identifies appropriate historical and other context for the alternate key rebinding. This historical data and other reference information may also be provided to the user. Finally, the system may intelligently determine, based on the historical frequency and other context of the user's behavioral interaction, determine an "optimal" time and other contextual scenarios to inject the alternative user behavioral motion.

It should be noted that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

In general, as may be used herein, "optimize" may refer to and/or defined as "maximize," "minimize," "best," or attain one or more specific targets, objectives, goals, or intentions. Optimize may also refer to maximizing a benefit to a user (e.g., maximize a trained machine learning scheduling agent benefit). Optimize may also refer to making the most effective or functional use of a situation, opportunity, or resource.

Additionally, optimizing need not refer to a best solution or result but may refer to a solution or result that "is good enough" for a particular application, for example. In some implementations, an objective is to suggest a "best" combination of operations, schedules, PE's, and/or machine learning models/machine learning pipelines, but there may be a variety of factors that may result in alternate suggestion of a combination of operations, schedules, PE's, and/or machine learning models/machine learning pipelines yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), static random access memory (SRAM), dynamic random access memory (DRAM), read-only memory (ROM), nonvolatile memory, erasable programmable read-only memory (EPROM or Flash memory), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Turning now to FIG. 1, computing environment 100 contains an example of an environment for the execution of at least some of the computer code involved in performing the inventive methods, such as code for acceleration of inflight deployments by inflight deployment module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible.

Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Turning now to FIG. 2, flow chart 200 depicts an exemplary method 200 for effecting intelligent, ergonomic keybinding adjustments based on user behavioral inputs, according to the mechanisms of the present invention. Method 200 begins as the user opts into the keybinding adjustment module (step 202), which provides access for peripheral, operating system (OS), and application-level information. The module captures and integrates at the OS and peripheral level (step 204, 208) by capturing such events as key presses, and system input monitoring at the OS level, and capturing current context and application information of the user (step 206, 212). In this manner, the integration of OS and peripherals begins monitoring the system and detecting and recording data such as frequency of usage and various patterns and other information as depicted.

To further describe the bifurcation of functionality depicted in steps 204, 206, and steps 208 and 212, the mechanisms of the present invention normalize inputs at the peripheral level (e.g., keyboard software). In addition, the mechanisms normalize inputs at the OS and application level (e.g., detecting inputs and key commands). Accordingly, a digital twin model of peripheral devices may be constructed, based on (1) exact and specific information maintained by a corpus held in conjunction with the unique peripheral asset, and (2) generic information based on and assumed from traditional known and expected hardware devices. A mapping of the peripheral device as obtained through the digital twin, or predicted adjacent buttons is thereby captured. This functionality is depicted as block/step 208.

Thus far in method 200, the keymapping adjustment module has finished monitoring the degree, frequency, speed, and other information (such as delay in between) key presses, key set presses, and other peripheral inputs. In one embodiment, the keymapping adjustment module detects and triggers on a degree of statistical significance larger than a "standard" usage as captured based on normal and standard deviation from that historically recorded. Accordingly, in decision step 214, method 200 queries whether statistical over significance been detected in user key press repetition.

To further illuminate the functionality depicted in step 214, consider that the uncommon amount of key presses, in one embodiment, actuates the keybinding readjustment module to monitor specific user behavior more closely and determine as a pattern of repetitive action, if the keybinding adjustment module captures an N number of patterns of the same or similar key presses in a condensed period of time, the module makes a decision to begin a remediation process. Further, if the module detects indicative events, or a context may be indicative of another upcoming repetitive pattern (step 216), the invention module notifies the user and prompts the user for their input or profiled input to determine if a re-binding is necessary (step 218).

As previously described, various computational functionality performed by the illustrated embodiments may be accomplished by use of AI deep learning and other operations as one of ordinary skill in the art will appreciate. For example in one embodiment, if the scaling and rules functionality (which may be incorporated into an AI computing component such as an engine) determines the user is a high likelihood and preference for rebinding, the keybinding adjustment module may take the user's input and retrieve the template digital twin or peripheral twin to make an estimation about an alternative that may fit the user better. This step may provide the user additional context such as historical impact of key change or this pattern of key change with similar use patterns.

Based on the previous data, the keymapping adjustment module then actuates and executes the rebinding while capturing user performance for future decisions and continued monitoring. After threshold T or dissipation of repetitive patterns, the module may return to normal.

Step 218 then depicts the functionality of notification to the user, evaluating rebinding performance metrics as implemented (step 222) and replacing the current key input requirement as a subsequent scenario with traditional input repetition is detected and/or expected (step 220).

Figure 3:
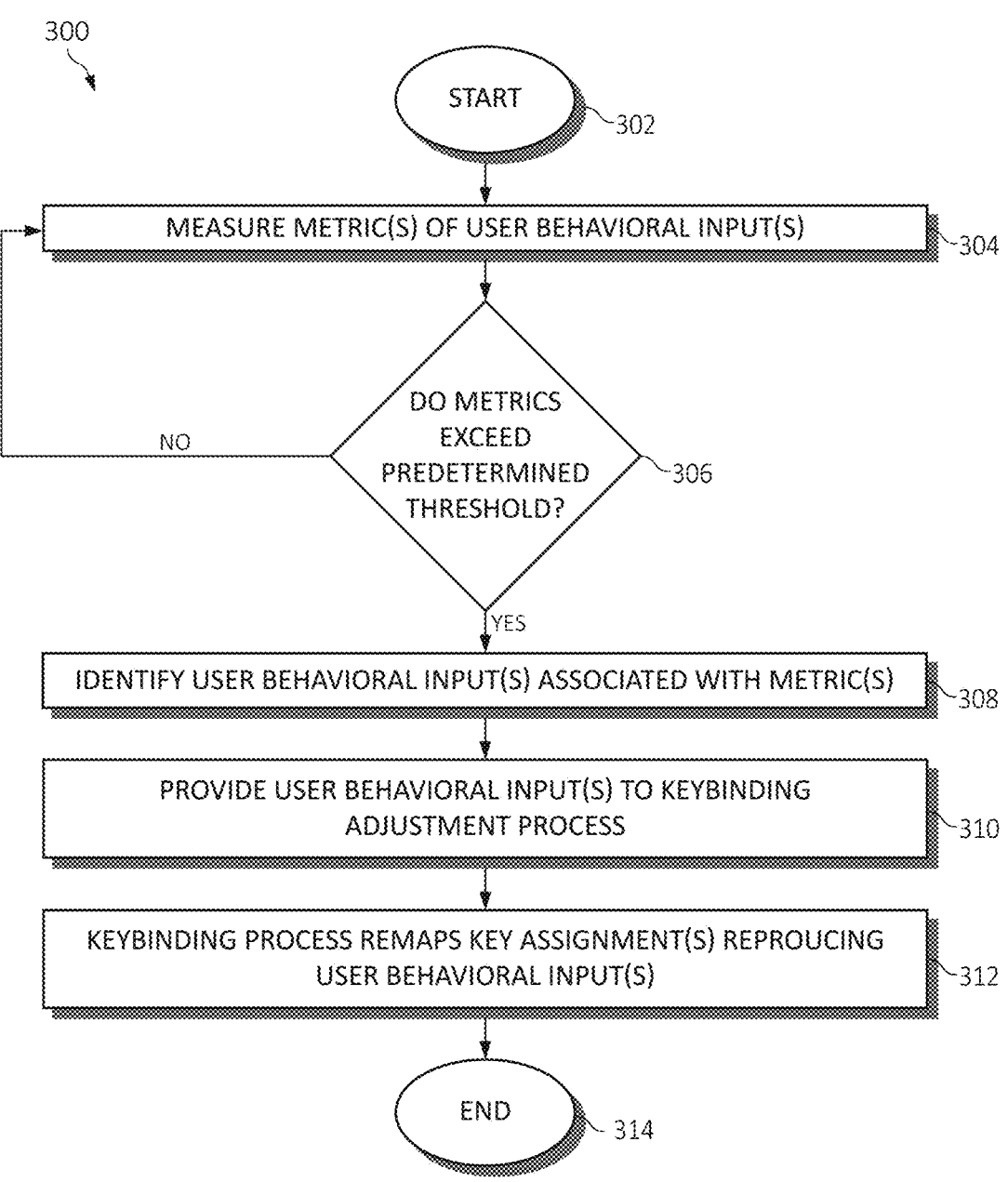
FIG. 3 is a flow chart diagram of an additional exemplary method for effecting intelligent, ergonomic keybinding adjustments in computing environments, again according to the mechanisms of the present invention.

Turning now to FIG. 3, method 300 depicts an additional exemplary embodiment of effecting intelligent, keybinding readjustment functionality based on user behavioral input(s) in a computing environment, according to the mechanisms of the present invention. Method 300 begins (step 302) with the measurement of various metrics corresponding to user behavioral inputs (step 304).

In decision step 306, following, the method 300 queries whether the observed metrics exceed a predetermined threshold. If no, the method 300 returns to step 304 to continue measurement and other detection functionality as previously described. If yes, the method 300 moves to step 308, where those user behavioral inputs associated with the measured metrics are gathered, to step 310, where the behavioral inputs are provided to the keybinding readjustment module for processing, and to step 312 where the keybinding process remaps various key assignments that are selected to reproduce the identified, potentially harmful repetitive user behavioral inputs. The method 300 then ends 314.

The present invention may be a system, a method, and/or a computer program product. The computer program product may include a computer readable storage medium (or media) having computer readable program instructions thereon for causing a processor to carry out aspects of the present invention, for implementing multiple thread scenes in a computing environment virtualized metaverse, according to an embodiment of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The descriptions of the embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for making ergonomic keybinding adjustments based on user behavioral inputs in a computing environment having one or more processor devices, comprising:

measuring one or more metrics of the user behavioral inputs;

if the one or more metrics are determined to exceed a predetermined threshold, identifying one or more of the user behavioral inputs associated with the one or more metrics to be provided to a keybinding adjustment process, the keybinding adjustment process remapping key assignments reproducing the one or more of the user behavioral inputs; and notifying a user performing the user behavioral inputs triggering the keybinding adjustment process, including querying the user to accept or reject a recommended remapping of the key assignments;

wherein the notifying the user includes notifying the user that the user has reached a possibly harmful level of repetition, and the recommended remapping relocates at least some of the user behavioral inputs to be performed by an opposite hand of the user.

2. The method of claim 1, further including monitoring the key assignments over a period of time through the keybinding adjustment process, and recommending alternative key mapping within adjacent keys, the adjacent keys also subject to the monitoring and alternative key mapping.

3. The method of claim 2, further including maintaining a contiguousness of the key assignments through the keybinding adjustment process and the alternative key mapping.

4. The method of claim 1, further including providing the user with an option to disable notifications and the keybinding readjustment process for a period of time.

5. The method of claim 1, further including as part of the keybinding adjustment process, determining, based on a context of the user behavioral inputs over time, using an Artificial Intelligence (AI) deep learning process, at least one of an optimal time or scenario in which the user behavioral inputs necessitate the remapping of the key assignments.

6. A system for making ergonomic keybinding adjustments based on user behavioral inputs in a computing environment having one or more processor devices, comprising:

one or more computers with executable instructions that when executed cause the system to:

measure one or more metrics of the user behavioral inputs, if the one or more metrics are determined to exceed a predetermined threshold, identify one or more of the user behavioral inputs associated with the one or more metrics to be provided to a keybinding adjustment process, the keybinding adjustment process remapping key assignments reproducing the one or more of the user behavioral inputs; and notify a user performing the user behavioral inputs triggering the keybinding adjustment process, including querying the user to accept or reject a recommended remapping of the key assignments;

wherein the notify the user includes notifying the user that the user has reached a possibly harmful level of repetition, and the recommended remapping relocates at least some of the user behavioral inputs to be performed by an opposite hand of the user.

7. The system of claim 6, wherein the executable instructions when executed cause the system to monitor the key assignments over a period of time through the keybinding adjustment process, and recommend alternative key mapping within adjacent keys, the adjacent keys also subject to the monitoring and alternative key mapping.

8. The system of claim 7, wherein the executable instructions when executed cause the system to maintain a contiguousness of the key assignments through the keybinding adjustment process and the alternative key mapping.

9. The system of claim 6, wherein the executable instructions when executed cause the system to provide the user with an option to disable notifications and the keybinding readjustment process for a period of time.

10. The system of claim 6, wherein the executable instructions when executed cause the system to, as part of the keybinding adjustment process, determine, based on a context of the user behavioral inputs over time, using an Artificial Intelligence (AI) deep learning process, at least one of an optimal time or scenario in which the user behavioral inputs necessitate the remapping of the key assignments.

11. A non-transitory computer program product for making ergonomic keybinding adjustments based on user behavioral inputs in a computing environment having one or more processor devices, the computer program product comprising:

one or more computer readable storage media, and program instructions collectively stored on the one or more computer readable storage media, the program instruction comprising:

program instructions to measure one or more metrics of a user input, program instructions to, if the one or more metrics are determined to exceed a predetermined threshold, identify one or more of the user behavioral inputs associated with the one or more metrics to be provided to a keybinding adjustment process, the keybinding adjustment process remapping key assignments reproducing the one or more of the user behavioral inputs; and program instructions to notify a user performing the user behavioral inputs triggering the keybinding adjustment process, including querying the user to accept or reject a recommended remapping of the key assignments;

wherein the program instructions to notify the user includes notifying the user that the user has reached a possibly harmful level of repetition, and the recommended remapping relocates at least some of the user behavioral inputs to be performed by an opposite hand of the user.

12. The computer program product of claim 11, further including program instructions to monitor the key assignments over a period of time through the keybinding adjustment process, and recommend alternative key mapping within adjacent keys, the adjacent keys also subject to the monitoring and alternative key mapping.

13. The computer program product of claim 12, further including program instructions to maintain a contiguousness of the key assignments through the keybinding adjustment process and the alternative key mapping.

14. The computer program product of claim 11, further including program instructions to provide the user with an option to disable notifications and the keybinding readjustment process for a period of time.

\* \* \* \* \*